US009137759B1

(12) United States Patent
Vargantwar et al.

(10) Patent No.: US 9,137,759 B1
(45) Date of Patent: Sep. 15, 2015

(54) METHOD AND SYSTEM OF ADJUSTING POWER CONTROL COMMAND RATE BASED ON POWER UTILIZATION

(75) Inventors: Sachin R. Vargantwar, Overland Park, KS (US); Manoj Shetty, Mumbai (IN); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 668 days.

(21) Appl. No.: 13/113,726

(22) Filed: May 23, 2011

(51) Int. Cl.
*H04W 74/00* (2009.01)
*H04W 52/24* (2009.01)
*H04W 84/18* (2009.01)
*G06F 1/32* (2006.01)

(52) U.S. Cl.
CPC .............. *H04W 52/24* (2013.01); *H04W 84/18* (2013.01); *G06F 1/3203* (2013.01)

(58) Field of Classification Search
CPC . H04W 52/221; H04W 52/26; H04W 52/367; H04W 52/60; H04W 16/14; H04W 24/08; H04W 52/143; H04W 52/223; H04W 72/085
USPC ........ 455/522, 69, 13.4, 127.5; 370/310, 318; 713/320
See application file for complete search history.

(56) References Cited

U.S. PATENT DOCUMENTS

| 6,208,873 B1 | 3/2001 | Black et al. |
| 6,256,301 B1 | 7/2001 | Tiedemann, Jr. et al. |
| 6,987,982 B2 | 1/2006 | Willenegger et al. |
| 2003/0125068 A1* | 7/2003 | Lee et al. ....................... 455/522 |
| 2003/0176203 A1* | 9/2003 | Sih et al. ....................... 455/522 |
| 2004/0092233 A1* | 5/2004 | Rudrapatna ..................... 455/69 |
| 2005/0143113 A1 | 6/2005 | Lee et al. |
| 2005/0153671 A1 | 7/2005 | Ichikawa |
| 2007/0191044 A1 | 8/2007 | Kostic et al. |

* cited by examiner

*Primary Examiner* — Shaima Q Aminzay

(57) ABSTRACT

A power control command (PCC) transmission scheme is disclosed. In one embodiment, the PCC transmission scheme may involve an access network engaging in a respective communication session with each of a plurality of access terminals on a given wireless link and sending a respective series of PCCs directed to each of the plurality of access terminals on the given wireless link. Based on a power utilization of the given wireless link, the access network may then decide to adjust a transmission rate at which to send PCCs directed to a set of access terminals in the plurality of access terminals. In turn, the access network may send the respective series of PCCs directed to each of the set of access terminals at the adjusted transmission rate.

20 Claims, 4 Drawing Sheets

METHOD AND SYSTEM OF ADJUSTING POWER CONTROL COMMAND RATE BASED ON POWER UTILIZATION

BACKGROUND

To provide cellular wireless communication service, a wireless service provider typically employs an access network that functions to connect one or more access terminals (e.g., cell phones, PDAs, laptops, netbooks, tablets, and/or other wirelessly-equipped devices) with one or more transport networks. In a typical access network, an area is divided geographically into a number of coverage areas, such as cells and sectors, each defined by a radio frequency (RF) radiation pattern from a respective base transceiver station (BTS). Within each coverage area, the BTS's RF radiation pattern may provide one or more wireless links, each on a carrier (or set of carriers), over which access terminals may communicate with the access network. In turn, the access network may provide connectivity with the public switched telephone network (PSTN), the Internet, and/or other transport networks.

The wireless links may carry communications between the access network and the access terminals according to any of a variety of wireless protocols. Depending on the protocol employed, each wireless link may also be divided into a plurality of channels for carrying communications between the access network and the access terminals. For example, each wireless link may include a plurality of forward-link channels, such as forward traffic channels, for carrying communications from the access network to the access terminals. As another example, each wireless link may include a plurality of reverse-link channels, such as reverse traffic channels, for carrying communications from the access terminals to the access network.

In many wireless protocols, while the access network and an access terminal are engaging in a communication session on a single wireless link, the access network and the access terminal may engage in default power-control processes to control transmission power on the wireless link for the communication session. In particular, the access network and the access terminal may engage in a default reverse power-control process to control the reverse transmission power at which the access terminal sends bearer data for the communication session on an established reverse traffic channel of the wireless link. Similarly, the access terminal and the access network may engage in a default forward power-control process to control the forward transmission power at which the access network sends bearer data for the communication session on an established forward traffic channel of the wireless link.

In an example default power-control process, a power-controlling entity may send a series of power control commands (PCCs) directed to a power-controlled entity on the wireless link, each of which instructs the power-controlled entity to adjust its transmission power on the wireless link for the communication session. To facilitate sending each such PCC, the power-controlling entity may determine a channel quality at which the wireless link is carrying the communication session and compare the determined channel-quality to a threshold channel-quality. Based on that comparison, the power-controlling entity may decide to send either a "power up" PCC that instructs the power-controlled entity to increase its transmission power on the wireless link for the communication session (if the determined channel-quality is less than the threshold channel-quality) or a "power down" PCC that instructs the power-controlled entity to decrease its transmission power on the wireless link for the communication session (if the determined channel-quality is greater than the threshold channel-quality).

As the power-controlling entity sends the series of PCCs directed to the power-controlled entity, the power-controlled entity may receive PCCs from the series of PCCs sent by the power-controlling entity. As it receives these PCCs, the power-controlled entity may responsively adjust its transmission power for the communication session on the wireless link. For instance, in response to receiving a "power up" PCC from the power-controlling entity, the power-controlled entity may increase its transmission power for the communication session on the wireless link. And in response to receiving a "power down" PCC from the power-controlling entity the power-controlled entity may decrease its transmission power for the communication session on the wireless link.

In certain protocols, an access network and an access terminal may also be capable of entering a "soft-handoff state" during which they engage in a communication session on multiple wireless links concurrently. While engaging in the communication session on the multiple wireless links, the access network and the access terminal may then engage in soft-handoff power-control processes to control transmission power on each of the multiple wireless links carrying the communication session.

In an example soft-handoff power-control process, a power-controlling entity may send a respective series of PCCs directed to a power-controlled entity on each of the multiple wireless links concurrently. For example, the power-controlling entity may send a first series of PCCs directed to the power-controlled entity on a first wireless link, a second series of PCCs directed to a power-controlled entity on a second wireless link, etc. To facilitate sending each such PCCs on each of the multiple wireless links, the power-controlling entity may use techniques similar to those described above with reference to the default power-control process.

As the power-controlling entity sends the respective series of PCCs directed to the power-controlled entity on each of the multiple wireless links concurrently, the power-controlled entity may receive PCCs from the respective series of PCCs sent by the power-controlling entity on each of the multiple wireless links. As it receives these PCCs, the power-controlled entity may responsively adjust its respective transmission power for the communication session on each of the multiple wireless links in a coordinated manner. For instance, in response to concurrently receiving a "power up" PCC from the power-controlling entity on all of the multiple wireless links (which indicates that the power-controlling entity is detecting a lower channel quality on all of the multiple wireless links), the power-controlled entity may increase its respective transmission power on all of the multiple wireless links. Further, in response to concurrently receiving a "power down" PCC from the power-controlling entity on any one or more of the multiple wireless links (which indicates that the power-controlling entity is detecting a higher channel quality on at least one of the multiple wireless links), the power-controlled entity may decrease its transmission power on all of the multiple wireless links.

Advantageously, the power-control processes described above may enable the access network and access terminals to balance between maintaining an acceptable strength of a traffic-channel communication and preventing the traffic-channel communication from becoming overly strong and unduly interfering with other communications.

OVERVIEW

Generally, a power-controlling entity may send power control commands (PCCs) on a wireless link at a power level that is substantially similar to the power level at which the power-controlling entity sends bearer data on the wireless link. In certain circumstances, however, the power-controlling entity may send PCCs on a wireless link at an increased power level relative to the power level at which the power-controlling entity sends bearer data on the wireless link.

In one such circumstance, upon entering a soft-handoff state, a power-controlling entity may be configured to increase the respective power level at which to send PCCs directed to the power-controlled entity on each of multiple wireless links by a predefined offset that correlates to the number of wireless links carrying the communication session (e.g., 2 dB for 2 wireless links, 3 dB for 3 wireless links, etc.). For instance, if the power-controlling entity and the power-controlled entity are initially engaging in the communication session on a single wireless link, the power-controlling entity may send a series of PCCs directed to the power-controlled entity on the single wireless link at a baseline power level that is equal to the power level at which the power-controlling entity sends bearer data to the power-controlled entity on the single wireless link. Thereafter, if the power-controlling entity and power-controlled entity begin engaging in the communication session on multiple wireless links, the power-controlling entity may send respective series of PCCs directed to the power-controlled entity on each of the multiple wireless links at a respective increased power level that is a predefined offset higher than the respective power level at which the power-controlling entity sends the bearer data for the communication session on each of the multiple wireless links.

By sending PCCs on a wireless link at an increased power level relative to the power level at which it sends bearer data on the wireless link (e.g., according to the example mechanism described above), a power-controlling entity may reduce the likelihood of the power-controlled entity failing to receive PCCs and thereby improve the overall effectiveness of the power-control process. However, the increased power level at which the power-controlling entity sends these PCCs may, in some instances, have negative effects on the performance of the access network as a whole.

One such negative effect is an increase in the power utilization on a given wireless link (i.e., a total amount of power used on the wireless link divided by a maximum allowable power of the wireless link). Typically, an access network engages in active communication with, and thus sends respective series of PCCs directed to, several different active access terminals on a given wireless link. And typically, the access network sends the respective series of PCCs directed to the active access terminals according to the same time schedule (e.g., the same reference clock and the same rate), in which case the access network periodically makes a simultaneous transmission of a respective PCC directed to each of the active access terminals. Thus, when the access network increases the power level at which to send PCCs directed to one or more of the active access terminals on the given wireless link within this configuration (e.g., according to the example mechanism described above), the access network's periodic PCC transmissions may cause "spikes" in the power utilization on the given wireless link.

As the magnitude of these spikes increases (e.g., due to an increase in soft-handoff communications carried by the given wireless link), the overall power utilization of the given wireless link may correspondingly increase. If this overall power utilization ultimately rises above a threshold level (e.g., 80%), the access network may then begin "power blocking" any new communications on the given wireless link until the overall power utilization falls back below the threshold level, thereby negatively affecting the performance of the access network as a whole. For at least this reason, a more intelligent PCC transmission scheme that accounts for power utilization of a given wireless link is desirable. Such a PCC transmission scheme would be particularly beneficial in circumstances where a power-controlling entity is sending increased-power PCCs directed to several power-controlled entities on the given wireless link.

Disclosed herein is such a PCC transmission scheme. According to the disclosed PCC transmission scheme, the access network may adjust a transmission rate at which to send PCCs directed to access terminals on a given wireless link based on the power utilization of the wireless link. For example, the access network may decrease the transmission rate at which to send PCCs directed to access terminals on the wireless link in response to determining that the power utilization has risen to an unacceptable level (e.g., at or near the power blocking threshold). As another example, the access network may increase a transmission rate at which to send PCCs directed to access terminals on the given wireless link in response to determining that the power utilization has fallen to an acceptable level. The access network may adjust a transmission rate based on the power utilization in other manners as well.

Advantageously, according to the disclosed PCC transmission scheme, the access network can dynamically reduce the transmission rate at which to send PCCs to different active access terminals on a given wireless link—and thus the rate at which power spikes occur on the given wireless link—when the power utilization on the given wireless link reaches an unacceptable level. This reduction in the rate at which power spikes occur may in turn reduce the likelihood of power blocking on the wireless link.

One embodiment of the exemplary PCC transmission scheme may take the form of a method that includes (a) engaging in a respective communication session with each of a plurality of access terminals on a given wireless link, (b) sending a respective series of PCCs directed to each of the plurality of access terminals on the given wireless link, (c) determining a power utilization on the given wireless link, (d) based on the determined power utilization, deciding to adjust a transmission rate at which to send PCCs directed to a set of access terminals in the plurality of access terminals on the given wireless link, and (e) sending the respective series of PCCs directed to each of the set of access terminals on the given wireless link at the adjusted transmission rate.

The feature of deciding to adjust the transmission rate at which to send PCCs directed to the set of access terminals may take various forms. In one aspect, deciding to adjust the transmission rate may take the form of deciding to decrease the transmission rate at which to send PCCs directed to the set of access terminals from a current transmission rate to a decreased transmission rate (e.g., a predefined transmission rate or a dynamic transmission rate). This decision to decrease the transmission rate may in turn take various forms.

In one example, the decision to decrease may include (a) determining that the determined power utilization exceeds a predetermined threshold, and (b) in response to the determining, deciding to decrease the transmission rate at which to send PCCs directed to the set of access terminals from the current transmission rate to a decreased transmission rate.

In another example, the decision to decrease may include (a) determining an extent by which the determined power utilization exceeds a predetermined threshold, (b) consulting a set of correlations between extents and transmission rates to identify a transmission rate that correlates to the determined extent, (c) determining that the identified transmission rate is not equal to a current transmission rate, and (d) in response to the determining, deciding to decrease the transmission rate at which to send PCCs directed to the set of access terminals from the current transmission rate to the identified transmission rate.

In yet another example, the decision to decrease may include (a) determining an extent by which the determined power utilization exceeds a predetermined threshold, (b) calculating a transmission rate using the determined extent and a predetermined equation, (c) determining that the calculated transmission rate is not equal to a current transmission rate, and (d) in response to the determining, deciding to decrease the transmission rate at which to send PCCs directed to the set of access terminals from the current transmission rate to the calculated transmission rate.

In still another example, the decision to decrease may include (a) consulting a set of correlations between determined power utilizations and transmission rates to identify a transmission rate that correlates to the determined power utilization, (b) determining that the identified transmission rate is not equal to a current transmission rate, and (c) in response to the determining, deciding to adjust the transmission rate at which to send PCCs directed to the set of access terminals from the current transmission rate to the identified transmission rate.

In a further example, the decision to decrease may include (a) calculating a transmission rate using the determined power utilization and a predetermined equation, (b) determining that the calculated transmission rate is not equal to a current transmission rate, and (c) in response to the determining, deciding to adjust the transmission rate at which to send PCCs directed to the set of access terminals from the current transmission rate to the calculated transmission rate. Other examples of this feature are possible as well.

In another aspect, deciding to adjust the transmission rate may take the form of deciding to increase the transmission rate at which to send PCCs directed to the set of access terminals from a current transmission rate to an increased transmission rate (e.g., a predefined transmission rate or a dynamic transmission rate). This decision to increase the transmission rate may also take various forms. For example, the decision to increase may include (a) determining that the determined power utilization is less than a predetermined threshold, and (b) in response to the determining, deciding to increase the transmission rate at which to send PCCs directed to the set of access terminals from a current transmission rate to an increased transmission rate. Other examples are possible as well.

The set of access terminals may also take various forms. In one example, the set of access terminals may include all of the plurality of access terminals. As another example, the set of access terminals may include access terminals in the plurality of access terminals that are operating in a soft-handoff state. Other examples are possible as well.

The determined power utilization on the given wireless link may also take various forms. In one example, the determined power utilization may be a total amount of power used on the given wireless link divided by a maximum allowable power on the given wireless link. As another example, the determined power utilization on the given wireless link may be a power utilization over the course of a predetermined time window. Other examples are possible as well.

Also disclosed herein is an access network entity (e.g., a base transceiver station, a base station controller and/or a mobile switching center) that includes (a) a first communication interface configured to facilitate a respective communication session with each of a plurality of access terminals on a given wireless link, (b) a second communication interface configured to facilitate communication with one or more access network entities, (c) a processor, (d) data storage, and (e) program instructions stored in data storage and executable by the processor to carry out the features described herein.

These as well as other aspects and advantages will become apparent to those of ordinary skill in the art by reading the following detailed description, with reference where appropriate to the accompanying drawings.

DETAILED DESCRIPTION

I. Communications System

Figure 1:
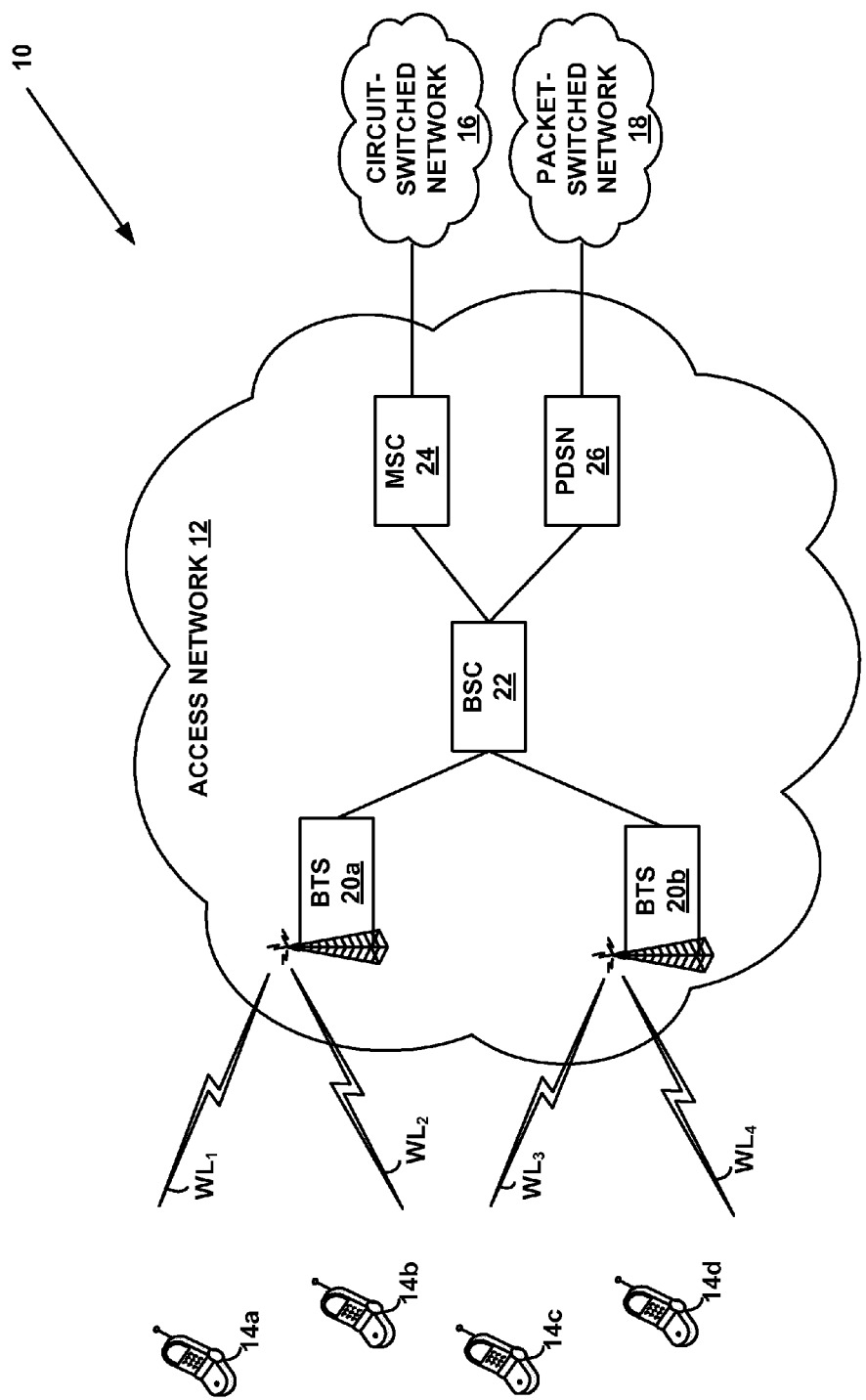
FIG. 1 is a simplified block diagram of a communication system in which a power control command (PCC) transmission scheme can be implemented.

FIG. 1 is a simplified block diagram of a communication system in which a power control command (PCC) transmission scheme can be implemented. As shown, the system 10 may include an access network 12 that functions to provide connectivity between one or more access terminals, such as access terminals 14a-d, and one or more transport networks, such as a circuit-switched network 16 (e.g., the Public Switched Telephone Network (PSTN)) and a packet-switched network 18 (e.g., the Internet).

It should be understood that the arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions written in any suitable programming language (e.g., C, C++, Java, etc.) and stored in memory.

As shown in FIG. 1, access network 12 may include one or more base transceiver stations (BTSs), such as BTS 20a and BTS 20b. (Although FIG. 1 depicts access network 12 as including two BTSs, it should be understood that access network 12 may include more than two BTSs.) Each BTS may be any entity that facilitates wireless communication between access network 12 and one or more access terminals, such as access terminals 14a-d. In particular, each BTS may radiate to define one or more wireless coverage areas, such as a sector and/or sectors. Within each of its coverage areas, each BTS may provide one or more wireless links over which one or more access terminals may communicate with the BTS. For example, as shown, BTS 20a may be configured to provide a first wireless link $WL_1$ and a second wireless link $WL_2$, and BTS 20b may be configured to provide a third wireless link $WL_3$ and a fourth wireless link $WL_4$. Various other configurations are possible as well. Each BTS may also control aspects of wireless communication with access terminals 14a-d, such as aspects of connection establishment, handoff, and/or power control for instance. Each BTS may perform other functions as well.

Each wireless link may carry communications between access network 12 and access terminals 14a-d according to any of a variety of protocols, including EIA/TIA/IS-856 Rel. 0, Rev. A, or other versions thereof ("IS-2000"), EIA/TIA/IS-856 Rel. 0, Rev. A, or other versions thereof ("IS-856"), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, or other protocols now known or later developed. Further, each wireless link may be divided into a forward link for carrying communications from access network 12 to the one or more access terminals 14a-d and a reverse link for carrying communications from the one or more access terminals 14a-d to access network 12. In turn, each forward link and each reverse link may be divided into a plurality of channels using any mechanism now known or later developed, including code division multiplexing, time division multiplexing, and/or frequency division multiplexing for instance.

For purposes of illustration only, the embodiments herein will be described by way of example with the wireless links carrying communications according to an IS-2000 protocol (also known as 1xRTT). According to IS-2000, each wireless link may be identified by its carrier frequency and a unique pseudonoise offset ("PN offset") that distinguishes the wireless link from other wireless links provided by access network 12. Each IS-2000 wireless link may include a forward link that is code division multiplexed via Walsh codes into various forward channels for carrying communications from access network 12 to one or more access terminals, such as a forward pilot channel, a forward sync channel, forward control channels (e.g., one or more forward paging channels, one or more forward common control channels, and/or a forward broadcast control channel), and one or more forward traffic channels (e.g., each of which may include a forward power control sub-channel). Similarly, each IS-2000 wireless link may include a reverse link that is code division multiplexed via Walsh codes into various reverse channels for carrying communications from one or more access terminals to access network 12, such as one or more reverse access channels, one or more reverse pilot channels (e.g., each of which may include a reverse power control sub-channel), and one or more reverse traffic channels.

According to IS-2000, access network 12 and any of access terminals 14a-d may be capable of entering a "soft-handoff state" during which they engage in a given communication session on multiple wireless links (defining the access terminal's "active set"). For instance, while in a soft-handoff state, access network 12 and access terminal 14a may have forward and reverse traffic channels established on two or more of wireless links $WL_1$-$WL_4$, such as wireless links $WL_1$, $WL_2$, and $WL_4$. In that case, access network 12 may send forward-bearer data for the given communication session on a respective forward link of each of wireless links $WL_1$, $WL_2$, and $WL_4$, and access terminal 14a may send reverse-bearer data for the given communication session on a respective reverse link of each of wireless links $WL_1$, $WL_2$, and $WL_4$. This ability to engage in a given communication session concurrently on multiple wireless links may enable access network 12 and access terminal 14a to remain connected over at least one wireless link at all times, which may result in a more seamless communication session as access terminal 14a moves through the access network's defined coverage areas. Further, this ability to engage in a given communication session concurrently on multiple wireless links may enable access network 12 and access terminal 14a to send and receive redundant data on multiple wireless links, which may result in a more reliable communication session. Other benefits may exist as well.

Referring again to FIG. 1, access network 12 may also include at least one base station controller (BSC), such as BSC 22, to which each BTS couples. (Although FIG. 1 depicts access network 12 as including one BSC, it should be understood that access network 12 may include more than one BSC, in which case each BSC may couple to a subset of the BTSs in access network 12. Further, although BSC 22 is depicted as separate entity from BTSs 20a-b, it should be understood that BSC 22 may be integrated together in whole or in part with one or both of BTSs 20a-b. Further yet, BSC 22 and one or both of BTSs 20a-b may together be referred to as a "base station.") BSC 22 may control aspects of BTSs 20a-b as well as aspects of wireless communication with access terminals 14a-d, such as aspects of connection establishment, handoff, and/or power control for instance. BSC 22 may perform other functions as well.

Further, access network 12 may include at least one mobile switching center (MSC), such as MSC 24, to which BSC 22 couples. (Although FIG. 1 depicts access network 12 as including one MSC, it should be understood that access network 12 may include more than one MSC, in which case each MSC may couple to a subset of the BSCs in access network 12.) As shown, MSC 24 may provide connectivity with circuit-switched network 16. Further, MSC 24 may control aspects of BTSs 20a-b and/or BSC 22 as well as aspects of wireless communication with access terminals 14a-d, such as aspects of connection establishment, handoff, and/or power control for instance. MSC 24 may perform other functions as well.

Further yet, access network 12 may include at least one packet data serving node (PDSN), such as PDSN 26, to which BSC 22 couples. (Although FIG. 1 depicts access network 12 as including one PDSN, it should be understood that access network 12 may include more than one PDSN, in which case each PDSN may couple to a subset of the BSCs in access network 12.) As shown, PDSN 26 may provide connectivity with packet-switched network 16. PSDN 26 may perform other functions as well.

Although not shown, access network 12 may also include and/or have access to various other entities. For example, access network 12 may include or have access to a home location register (HLR) and/or a visitor location register (VLR) that maintains profile data for subscribers and/or access terminals in access network 12, such as account information, preferences, and/or a last-known location for instance. Other examples are possible as well.

Each of access terminals 14a-d may be any device configured to receive wireless service from access network 12. By way of example only, each of access terminals 14a-d may take the form of a cellular telephone, a computer (e.g., a desktop, laptop, tablet, netbook, etc.), a personal digital assistant (PDA), or a personal navigation device (PND). Other examples are possible as well.

II. Current PCC Transmission Scheme a. Single-Link Communications

In the example communication system 10 depicted in FIG. 1, access network 12 and one of access terminals 14a-d, such as access terminal 14a, may begin engaging in a given communication session on a single wireless link, such as wireless link $WL_1$. For instance, access network 12 and access terminal 14a may first establish a forward traffic channel and a reverse traffic channel on wireless link $WL_1$. In turn, access network 12 may begin to send forward-bearer data for the given communication session at an initial forward transmission power value (e.g., 2.2 watts) on the established forward channel of wireless link $WL_1$. Similarly, access terminal 14a may begin to send reverse-bearer data for the given communication session at an initial reverse transmission power value (e.g., 0 dBm) on the established reverse channel of wireless link $WL_1$.

As noted above, while access network 12 and access terminal 14a are engaging in the given communication session on wireless link $WL_1$, access network 12 and access terminal 14a may also engage in a power-control process to control the transmission power for the given communication session on wireless link $WL_1$. In particular, access network 12 and access terminal 14a may engage in a reverse power-control process to control the reverse transmission power at which access terminal 14a sends bearer data for the given communication session on the established reverse traffic channel of wireless link $WL_1$ (i.e., the reverse traffic power for the given communication session). Similarly, access terminal 14a and access network 12 may engage in a forward power-control process to control the forward transmission power at which access network 12 sends bearer data for the given communication session on the established forward traffic channel of wireless link $WL_1$ (i.e., the forward traffic power for the given communication session). These power-control processes may take various forms.

i. Example Reverse Power-Control

According to an example reverse power-control process, access network 12 may regularly determine a quality at which the established reverse traffic channel of wireless link $WL_1$ is carrying the given communication session (i.e., a reverse-channel quality). Access network 12 may then regularly compare the determined reverse-channel quality to a threshold reverse-channel quality and thereby decide whether to send a "power up" PCC that instructs access terminal 14a to increase its reverse traffic power for the given communication session on wireless link $WL_1$ or a "power down" PCC that instructs access terminal 14a to decrease its reverse traffic power for the given communication session on wireless link $WL_1$. For instance, based on each comparison, access network 12 may decide to send (a) a "power up" PCC directed to access terminal 14a if the determined reverse-channel quality is less than the threshold reverse-channel quality (which indicates that access network 12 is detecting a lower reverse-channel quality) or (b) a "power down" PCC directed to access terminal 14a if the measured reverse-channel quality is greater than the threshold reverse-channel quality (which indicates that access network 12 is detecting a higher reverse-channel quality). Accordingly, access network 12 may send a series of PCCs directed to access terminal 14a on wireless link $WL_1$.

As access network 12 sends the series of PCCs directed to access terminal 14a on wireless link $WL_1$, access terminal 14a may receive the series of PCCs from access network 12 on wireless link $WL_1$. (As noted above, however, that access terminal 14a may fail to receive some PCCs sent by access network 12 due to poor forward-channel quality or other factors.) In response to each PCC received from access network 12 on wireless link $WL_1$, access terminal 14a may then responsively adjust its reverse traffic power on wireless link $WL_1$ in accordance with the PCC. For instance, access terminal 14a may increase its reverse traffic power on wireless link $WL_1$ in response to receiving a "power up" PCC from access network 12 and decrease its reverse traffic power on wireless link $WL_1$ in response to receiving a "power down" PCC from access network 12. Accordingly, during this reverse power-control process, access terminal 14a may continually adjust its reverse traffic power for the given communication session on wireless link $WL_1$.

ii. Example Forward Power-Control

According to an example forward power-control process, access terminal 14a may regularly determine a quality at which the established forward traffic channel of wireless link $WL_1$ is carrying the given communication session (i.e., a forward-channel quality). Access terminal 14a may then regularly compare the determined forward-channel quality to a threshold forward-channel quality and thereby decide whether to send a "power up" PCC that instructs access network 12 to increase its forward traffic power on wireless link $WL_1$ or a "power down" PCC that instructs access network 12 to decrease its forward traffic power on wireless link $WL_1$. For instance, based on each comparison, access terminal 14a may decide to send (a) a "power up" PCC directed to access network 12 if the determined forward-channel quality is less than the threshold forward-channel quality (which indicates that access terminal 14a is detecting a lower forward-channel quality) or (b) a "power down" PCC directed to access network 12 if the measured forward-channel quality is greater than the threshold forward-channel quality (which indicates that access terminal 14a is detecting a higher forward-channel quality). Accordingly, access terminal 14a may send a series of PCCs directed to access network 12 on wireless link $WL_1$.

As access terminal 14a sends the series of PCCs directed to access network 12 on wireless link $WL_1$, access network 12 may receive the series of PCCs from access terminal 14a on wireless link $WL_1$. (Likewise, however, access network 12 may fail to receive some PCCs sent by access terminal 14 due to poor reverse-channel quality or other factors.) In response to each PCC received from access terminal 14a on wireless link $WL_1$, access network 12 may then responsively adjust its forward traffic power for the given communication session on wireless link $WL_1$ in accordance with the PCC. For instance, access network 12 may increase its forward traffic power for the given communication session on wireless link $WL_1$ in response to receiving a "power up" PCC from access terminal 14a and decrease its forward traffic power on wireless link $WL_1$ for the given communication session in response to receiving a "power down" PCC from access terminal 14a. Accordingly, during this forward power-control process, access network 12 may continually adjust its forward traffic power for the given communication session on wireless link $WL_1$.

iii. PCC Transmission Power and Rate

While engaging in the power-control processes described above, access network 12 and access terminal 14a may send PCC data on wireless link $WL_1$ at a baseline power level that is equal to the power level at which access network 12 and access terminal 14a send bearer data for the given communication session on wireless link $WL_1$. For instance, the forward power at which access network 12 sends PCCs directed to access terminal 14a on the established forward channel of wireless link $WL_1$ (i.e., the baseline forward PCC power level) may be equal to the access network's forward traffic power for the given communication session on wireless link $WL_1$, which varies depending on the PCCs received from access terminal 14a on wireless link $WL_1$. Similarly, the reverse power at which access terminal 14a sends PCCs directed to access network 12 on wireless link $WL_1$ (i.e., the baseline reverse PCC power level) may be equal to the access terminal's reverse traffic power for the given communication session on wireless link $WL_1$, which varies depending on the PCCs received from access network 12 on wireless link $WL_1$. Other examples are possible as well, including the possibility that access network 12 and access terminal 14a send PCC data on wireless link $WL_1$ at a power level that is increased relative to the power level at which access network 12 and access terminal 14a send bearer data for the given communication session on wireless link $WL_1$.

While engaging in the power-control processes described above, access network 12 and access terminal 14a may also send PCC data at a predefined transmission rate. For example, access network 12 and access terminal 14a may each send PCCs at a rate of 800 PCCs/second. Other examples are possible as well.

b. Multiple-Link Communications

At some point during the given communication session (if not at the start of the session), access network 12 and access terminal 14a may also enter a soft-handoff state and begin engaging in the given communication session on multiple wireless links, such as wireless links $WL_1$, $WL_2$, and $WL_4$. For instance, access network 12 and access terminal 14a may establish additional forward and reverse traffic channels on each of wireless links $WL_2$ and $WL_4$. In turn, access network 12 may continue to send the forward-bearer data for the given communication session at the forward traffic power on wireless link $WL_1$ (which varies depending on the PCCs received from access terminal 14a on wireless link $WL_1$) and begin to send the forward-bearer data for the given communication session at an initial forward traffic power value (e.g., 2.2 watts) on each of wireless links $WL_2$ and $WL_4$. Similarly, access terminal 14a may continue to send reverse-bearer data for the given communication session at the reverse traffic power on wireless link $WL_1$ (which varies depending on the PCCs received from access network 12 on wireless link $WL_1$) and begin to send the reverse-bearer data for the given communication session at an initial reverse traffic power value (e.g., 0 dBm) on each of wireless links $WL_2$ and $WL_4$.

While access network 12 and access terminal 14a are engaging in the given communication session on wireless links $WL_1$, $WL_2$, and $WL_4$, access network 12 and access terminal 14a may also engage in a power-control process to control transmission power for the given communication session on each of wireless links $WL_1$, $WL_2$, and $WL_4$. In particular, access network 12 and access terminal 14a may engage in a reverse power-control process to control the access terminal's respective reverse traffic power for the given communication session on each of wireless links $WL_1$, $WL_2$, and $WL_4$. Similarly, access terminal 14a and access network 12 may engage in a forward power-control process to control the access network's respective forward traffic power for the given communication session on each of wireless links $WL_1$, $WL_2$, and $WL_4$. These power-control processes may take various forms.

i. Example Reverse Power-Control

According to an example reverse power-control process, while engaging in the given communication session on wireless links $WL_1$, $WL_2$, and $WL_4$, access network 12 may regularly determine a respective reverse-channel quality at which each of wireless links $WL_1$, $WL_2$, and $WL_4$ is carrying the given communication session. For each of wireless links $WL_1$, $WL_2$, and $WL_4$, access network 12 may then regularly compare the determined reverse-channel quality to a threshold reverse-channel quality and thereby decide whether to send a "power up" PCC that instructs access terminal 14a to increase its reverse traffic power for the given communication session on the wireless link or a "power down" PCC that instructs access terminal 14a to decrease its reverse traffic power for the given communication session on the wireless link. Accordingly, access network 12 may concurrently send a respective series of PCCs directed to access terminal 14a on each of wireless links $WL_1$, $WL_2$, and $WL_4$.

As access network 12 concurrently sends the respective series of PCCs directed to access terminal 14a on each of wireless links $WL_1$, $WL_2$, and $WL_4$, access terminal 14a may receive the respective series of PCCs concurrently on each of wireless links $WL_1$, $WL_2$, and $WL_4$. As noted above, however, access terminal 14a may fail to receive some PCCs sent by access network 12 due to poor forward-link quality or other factors.

As access terminal 14a concurrently receives the respective series of PCCs sent by access network 12 on each of wireless links $WL_1$, $WL_2$, and $WL_4$, access terminal 14a may adjust its respective reverse traffic power for the given communication session on all of wireless links $WL_1$, $WL_2$, and $WL_4$ in a coordinated manner. For instance, access terminal 14a may increase its respective reverse traffic power on all of wireless links $WL_1$, $WL_2$, and $WL_4$ in response to receiving a "power up" PCC from access network 12 concurrently on all of wireless links $WL_1$, $WL_2$, and $WL_4$ (which indicates that access network 12 is detecting a lower reverse-channel quality on all of wireless links $WL_1$, $WL_2$, and $WL_4$). And access terminal 14a may decrease its respective reverse traffic power on all of wireless links $WL_1$, $WL_2$, and $WL_4$ in response to receiving a "power down" PCC from access network 12 on any of wireless links $WL_1$, $WL_2$, and $WL_4$ (which indicates that access network 12 is detecting a higher reverse-channel quality on at least one of wireless links $WL_1$, $WL_2$, and $WL_4$). Other examples are possible as well.

Accordingly, during this reverse power-control process, access terminal 14a may continually adjust its respective reverse traffic power for the given communication session on each of wireless links $WL_1$, $WL_2$, and $WL_4$.

ii. Example Forward Power-Control

According to an example forward power-control process, while engaging in the given communication session on wireless links $WL_1$, $WL_2$, and $WL_4$, access terminal 14a may regularly determine a respective forward-channel quality at which each of wireless links $WL_1$, $WL_2$, and $WL_4$ is carrying the given communication session. For each of wireless links $WL_1$, $WL_2$, and $WL_4$, access terminal 14a may regularly compare the determined forward-channel quality to a threshold forward-channel quality and thereby decide whether to send a "power up" PCC that instructs access network 12 to increase its forward traffic power for the given communication session on the wireless link or a "power down" PCC that instructs access network 12 to decrease its forward traffic power for the given communication session on the wireless link. Accordingly, access terminal 14a may concurrently send a respective series of PCCs directed to access network 12 on each of wireless links $WL_1$, $WL_2$, and $WL_4$.

As access terminal 14a concurrently sends the respective series of PCCs directed to access network 12 on each of wireless links $WL_1$, $WL_2$, and $WL_4$, access network 12 may receive the respective series of PCCs concurrently on each of wireless links $WL_1$, $WL_2$, and $WL_4$. As noted above, however, access network 12 may fail to receive some PCCs sent by access terminal 14a due to poor reverse-link quality or other factors.

As access network 12 concurrently receives the respective series of PCCs sent by access terminal 14a on each of wireless links $WL_1$, $WL_2$, and $WL_4$, access network 12 may also adjust its respective forward traffic power for the given communication session on each of wireless links $WL_1$, $WL_2$, and $WL_4$ in a coordinated manner. For instance, access network 12 may increase its respective forward traffic power on all of wireless links $WL_1$, $WL_2$, and $WL_4$ in response to receiving a "power up" PCC from access terminal 14a concurrently on all of wireless links $WL_1$, $WL_2$, and $WL_4$ (which indicates that access terminal 14 is detecting a lower forward-channel quality on all of wireless links $WL_1$, $WL_2$, and $WL_4$). And access network 12 may decrease its respective forward traffic power on all of wireless links $WL_1$, $WL_2$, and $WL_4$ in response to receiving a "power down" PCC from access terminal 14a on any of wireless links $WL_1$, $WL_2$, and $WL_4$ (which indicates that access terminal 14 is detecting a higher forward-channel quality on at least one of wireless links $WL_1$, $WL_2$, and $WL_4$). Other examples are possible as well.

Accordingly, during this forward power-control process, access network 12 may continually adjust its respective forward traffic power for the given communication session on each of wireless links $WL_1$, $WL_2$, and $WL_4$.

iii. PCC Transmission Power

In certain protocols such as IS-2000, after beginning to engage in the given communication session on multiple wireless links, access network 12 and access terminal 14a may each be configured to increase the respective power level at which to send PCCs on each of the multiple wireless links by a predefined offset that correlates to the number of wireless links carrying the communication session (e.g., 2 dB for 2 wireless links, 3 dB for 3 wireless links, etc.). For instance, after beginning to engage in the given communication session on wireless links $WL_1$, $WL_2$, and $WL_4$, the access network's respective forward PCC power for each of wireless links $WL_1$, $WL_2$, and $WL_4$ may be a predefined offset higher (e.g., 3 dB) than the access network's respective forward traffic power for the given communication session on each of wireless links $WL_1$, $WL_2$, and $WL_4$. Similarly, the access terminal's respective reverse PCC power for each of wireless links $WL_1$, $WL_2$, and $WL_4$ may be a predefined offset (e.g., 3 dB) higher than the access terminal's respective reverse traffic power for the given communication session on each of wireless links $WL_1$, $WL_2$, and $WL_4$.

By sending PCCs at an increased power level relative to the traffic power level, access network 12 may reduce the likelihood of the access terminal 14a failing to receive PCCs and thereby improve the overall effectiveness of the power-control process. However, the increased power level at which access network 12 sends these PCCs may, in some instances, have negative effects on the performance of access network 12 as a whole.

As described above, one such negative effect is an increase in the power utilization on a given wireless link (i.e., a total amount of power used on the wireless link divided by a maximum allowable power of the wireless link). Typically, access network 12 engages in active communication with, and thus sends respective series of PCCs directed to, several different active access terminals, such as access terminals 14a-d, on a given wireless link, such as wireless link $WL_1$. And typically, access network 12 sends the respective series of PCCs directed to the active access terminals 14a-d according to the same time schedule (e.g., the same reference clock and the same rate), in which case access network 12 periodically makes a simultaneous transmission of a respective PCC directed to each of the active access terminals.

Figure 2:
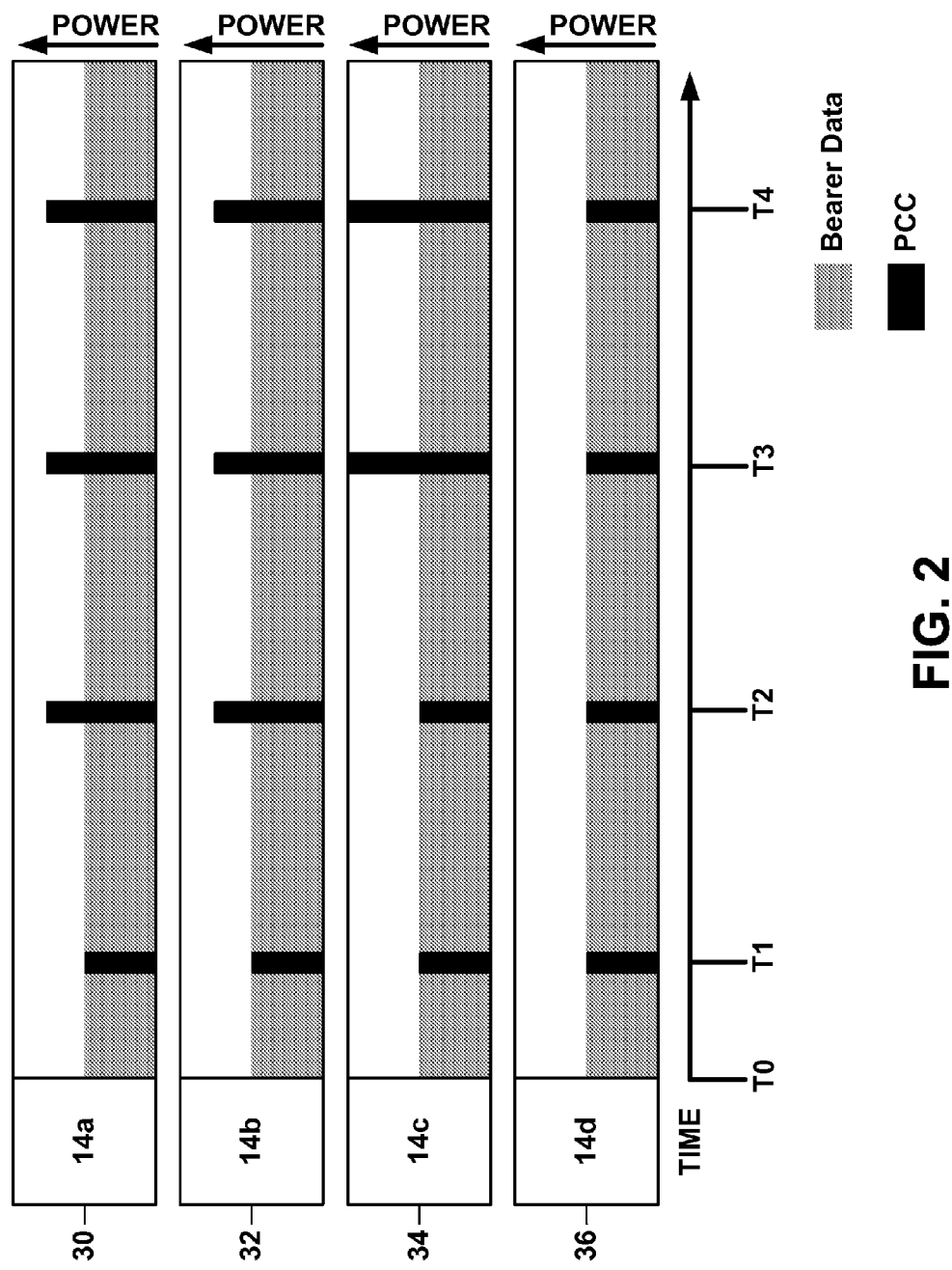
FIG. 2 depicts a timeline of baseline traffic and PCC power levels for respective communication sessions between an access network and a plurality of access terminals on a given forward-link channel of a wireless link, according to an example PCC transmission scheme.

The access network's periodic, simultaneous transmissions can be seen in FIG. 2, which depicts an example timeline of transmission power levels for respective data streams sent from access network 12 to each of access terminals 14a-d on respective forward-traffic channels of wireless link $WL_1$, in accordance with the example PCC transmission scheme described above. For purposes of illustration, FIG. 2 depicts the transmission power of bearer data (i.e., forward traffic power) in gray and the transmission power of PCC data (i.e., the forward PCC power) in black. Further, for purposes of illustration only, FIG. 2 depicts the different transmission power levels as being substantially similar for each communication session. It should be understood, however, the transmission power levels for each communication session on wireless link $WL_1$ may be varying continually based on the PCCs sent by the respective access terminals 14a-d.

At a time instance T0, access network 12 may initially be engaging in single-link communications sessions with each of access terminals 14a-d. In this respect, access network 12 may be sending respective bearer data to each of access terminals 14a-d at a first power level.

In accordance with the example PCC transmission scheme described above, access network 12 may also be configured to send PCCs to each of access terminals 14a-d according to the same time schedule. As such, at a time instance T1, access network 12 may send a first respective PCC to each of access terminals 14a-d. And because the respective communication session with each of access terminals 14a-d is a single-link communication at this instance, access network 12 may send the first respective PCC to each of access terminals 14a-d at a first power level.

Sometime before a time instance T2, access network 12 may begin engaging in the respective communication with each of access terminals 14a-b over two wireless links. In response, access network 12 may increase the power level at which it transmit PCCs to each of access terminals 14a-b by a predetermined offset that correlates to the number of wireless links carrying each respective communication session (in this case two).

At time instance T2, access network 12 may then send a second respective PCC to each of access terminals 14a-d. In particular, access network 12 may send a second respective PCC to each of access terminals 14a-b at a second power level (because these access terminals are communicating over two links) and a second respective PCC to each of access terminals 14c-d at the first power level. These increased-power PCCs directed to access terminals 14a-b may cause a temporary "spike" in the power utilization of wireless link $WL_1$.

Sometime before a time instance T3, access network 12 may then begin engaging in the respective communication with access terminals 14c over three wireless links. In response, access network 12 may increase the power level at which it transmit PCCs to access terminal 14c by a predetermined offset that correlates to the number of wireless links carrying each respective communication session (in this case three).

At time instance T3, access network 12 may then send a third respective PCC to each of access terminals 14a-d. In particular, access network 12 may send a third respective PCC to each of access terminals 14a-b at the second power level (because these access terminals are communicating over two links), a third respective PCC to access terminal 14c at the third power level (because these access terminals are communicating over three links), and a third respective PCC to access terminal 14*d* at the first power level. These increased-power PCCs directed to access terminals 14*a-c* may cause another temporary "spike" in the power utilization on wireless link $WL_1$ that is increased relative to the spike at time instance T2.

At a time instance T4, access network 12 may then send a fourth respective PCC to each of access terminals 14*a-d*. In particular, access network 12 may send a fourth respective PCC to each of access terminals 14*a-b* at the second power level (because these access terminals are communicating over two links), a fourth respective PCC to access terminal 14*c* at the third power level (because these access terminals are communicating over three links), and a fourth respective PCC to access terminal 14*d* at the first power level. These increased-power PCCs directed to access terminals 14*a-c* may cause yet another temporary "spike" in the power utilization on wireless link $WL_1$ that is equal to the spike at time instance T3.

As the magnitude of these temporary spikes continues to increase (e.g., due to an increase in multi-link communications on wireless link $WL_1$), the overall power utilization of wireless link $WL_1$ may correspondingly increase. If this overall power utilization ultimately rises above a threshold level (e.g., 80%), access network 12 may then begin "power blocking" any new communications on wireless link $WL_1$ until the overall power utilization falls back below the threshold level, thereby negatively affecting the performance of the access network as a whole.

For at least this reason, a more intelligent PCC transmission scheme that accounts for power utilization of wireless link $WL_1$ is desirable. Such a PCC transmission scheme would be particularly beneficial in circumstances where access network 12 is sending increased-power PCCs directed to several access terminals 14*a-d* on wireless link $WL_1$ as described above, but may be applicable in other circumstances as well

III. Exemplary PCC Transmission Scheme

Figure 3:
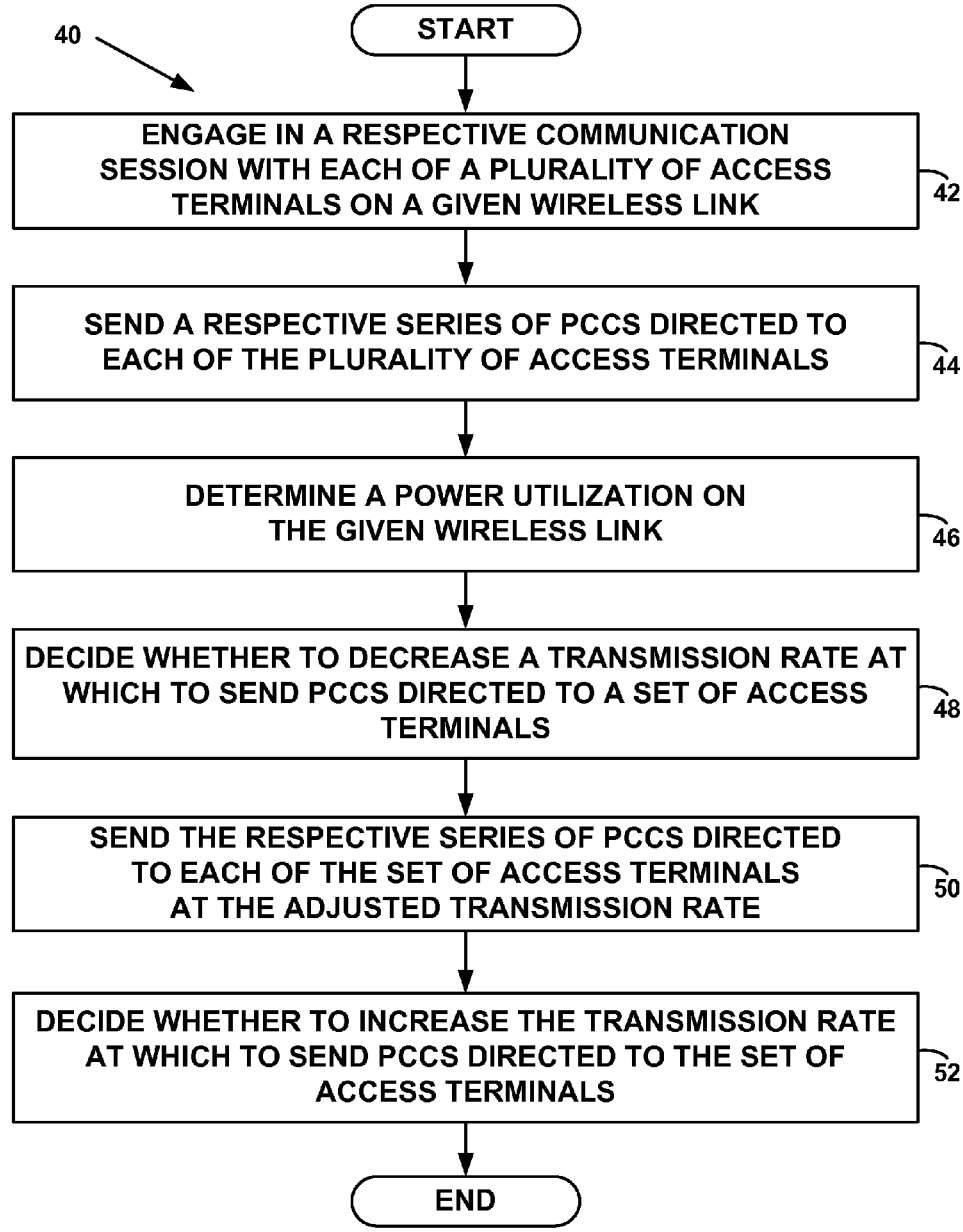
FIG. 3 is a simplified flow chart depicting an embodiment of a disclosed PCC transmission scheme.

FIG. 3 is a simplified flow chart depicting an example embodiment 40 of the disclosed PCC transmission scheme. For purposes of illustration, example embodiment 40 will be described with reference to access network 12 sending PCCs directed to a plurality of access terminals, such as access terminals 14*a-d*, on a given wireless link, such as wireless link $WL_1$. It should be understood, however, that example embodiment 36 may be applicable to any configuration in which a first entity is sending PCCs directed to a plurality of other entities on a single wireless link.

Example embodiment 40 begins at step 42 with access network 12 engaging in a respective communication session with each of access terminals 14*a-d* on wireless link $WL_1$. Some of these communication sessions may be single-link communications that are occurring on wireless link $WL_1$ only. Others of the communication sessions may be multiple-link communications that are occurring on both wireless link $WL_1$ and one or more other wireless links (e.g., wireless link $WL_2$).

At step 44, access network 12 may be sending a respective series of PCCs directed to each of access terminals 14*a-d* on wireless link $WL_1$. The respective power level at which access network 12 sends the respective series of PCCs directed to each access terminals 14*a-d* on wireless link $WL_1$ may take various forms. In one example, if access network 12 is engaging in a respective communication session with any of access terminals 14*a-d* on wireless link $WL_1$ only, the respective power level at which access network 12 sends the respective series of PCCs directed to such access terminal(s) may be equal to a respective power level at which access network 12 sends bearer data directed to such access terminal(s). In another example, if access network 12 is engaging in a respective communication session with any of access terminals 14*a-d* on multiple wireless links, the respective power level at which access network 12 sends the respective series of PCCs directed to such access terminal(s) may be a predefined offset higher than a respective power level at which access network 12 sends bearer data directed to such access terminal(s). Other examples are possible as well. It should also be understood that these power levels may also vary as access network 12 receives PCCs sent by access terminals 14*a-d*.

At step 46, access network 12 may determine a power utilization on wireless link $WL_1$. The power utilization may be, for example, a total amount of power used on wireless link $WL_1$ divided by a maximum allowable power on wireless link $WL_1$. According to one technique, access network 12 may perform this determining by monitoring a power utilization on the given wireless link over the course of a predetermined time window. For instance, access network 12 may take one or more power utilization measurements during the predefined time window. The determined power utilization may be a mean, median, root-mean-square, maximum, minimum or other value derived from the one or more power utilization measurements. Other techniques are possible as well.

At step 48, based on the determined power utilization, access network 12 may decide whether to adjust a transmission rate at which to send PCCs directed to a set of access terminals in the plurality of access terminals 14*a-d* on wireless link $WL_1$. For example, access network 12 may decide whether to decrease the transmission rate at which to send PCCs directed to a set of access terminals on wireless link $WL_1$ from a current transmission rate to a decreased transmission rate in response to determining that the power utilization has risen to an unacceptable level. As another example, access network 12 may decide whether to increase the transmission rate at which to send PCCs directed to a set of access terminals on wireless link $WL_1$ from a current transmission rate to an increased transmission rate in response to determining that the power utilization has fallen back to an acceptable level. Access network 12 may carry out this decision according to various techniques, which may be implemented separately or together. For purposes of illustration only, the following techniques will be described with reference to access network 12 deciding whether to decrease the transmission rate at step 48, but it should be understood that these techniques may also apply to access network 12 deciding whether to increase the transmission rate.

According to a first technique, access network 12 may decide to decrease the transmission rate at which to send PCCs directed to the set of access terminals by (a) determining that the determined power utilization exceeds a predetermined threshold and (b) in response to the determining, deciding to decrease the transmission rate at which to send PCCs directed to the set of access terminals from a current transmission rate to a decreased transmission rate.

The predetermined threshold in the first technique may take many forms. In one instance, the predetermined threshold may be a value of power utilization in the form of, for example, a ratio. In another instance, the predetermined threshold may be a value of power utilization as well as a length of time, such that the determined power utilization exceeds the predetermined threshold only if the determined power utilization is greater than the value of power utilization for at least the length of time. The predetermined threshold may take other forms as well. The predetermined threshold in the first technique may be predetermined based on, for example, experimental data or mathematical calculations. For instance, the predetermined threshold may be determined according to a predesigned model and/or feedback regarding power utilization on wireless link $WL_1$. The predetermined threshold may take other forms as well.

According to a second technique, access network 12 may decide to decrease the transmission rate at which to send PCCs directed to the set of access terminals by (a) determining an extent by which the determined power utilization exceeds a predetermined threshold, (b) consulting a set of correlations between extents and transmission rates to identify a transmission rate that correlates to the determined extent, (c) determining that the identified transmission rate is not equal to a current transmission rate, and (d) in response to the determining, deciding to decrease the transmission rate at which to send PCCs directed to the first set of access terminals from the current transmission rate to the identified transmission rate.

The predetermined threshold in the second technique may take any of the forms described above. Further, the correlations in the second technique may take many forms. In one instance, the correlations may be predetermined based on, for example, experimental data or mathematical calculations. For example, each of the correlations may be determined according to a predesigned model. Alternately or additionally, the correlations may be variable based on data gathered during operation of access network 12. Still alternately or additionally, the correlations may be adjusted based on feedback collected and/or received by access network 12 regarding power utilization on wireless link $WL_1$. Other types of correlations are possible as well. In general, in the correlations, higher extents by which the determined power utilization exceeds a predetermined threshold power utilization may be correlated with lower (less frequent) transmission rates.

According to a third technique, access network 12 may decide to decrease the transmission rate at which to send PCCs directed to the set of access terminals by (a) determining an extent by which the determined power utilization exceeds a predetermined threshold, (b) calculating a transmission rate using the determined extent and a predetermined equation, (c) determining that the calculated transmission rate is not equal to a current transmission rate, and (d) in response to the determining, deciding to decrease the transmission rate at which to send PCCs directed to the first set of access terminals from the current transmission rate to the calculated transmission rate.

The predetermined threshold in the third technique may take any of the forms described above. Further, the predetermined equation in the third technique may take many forms. In one instance, the predetermined equation may be predetermined based on, for example, experimental data or mathematical calculations. For example, the predetermined equation may be determined according to a predesigned model and/or feedback regarding power utilization on wireless link $WL_1$. The predetermined equation may take other forms as well.

According to a fourth technique, access network 12 may decide to adjust the transmission rate at which to send PCCs directed to the set of access terminals by (a) consulting a set of correlations between determined power utilizations and transmission rates to identify a transmission rate that correlates to the determined power utilization, (b) determining that the identified transmission rate is not equal to a current transmission rate, and, (c) in response to the determining, deciding to adjust the transmission rate at which to send PCCs directed to the set of access terminals from the current transmission rate to the identified transmission rate. The correlations in the fourth technique may take any of the forms described above. In general, in the correlations, higher power utilizations may be correlated with lower (less frequent) transmission rates.

According to a fifth technique, access network 12 may decide to adjust the transmission rate at which to send PCCs directed to the set of access terminals by (a) calculating a transmission rate using the determined power utilization and a predetermined equation, (b) determining that the calculated transmission rate is not equal to a current transmission rate, and, (c) in response to the determining, deciding to adjust the transmission rate at which to send PCCs directed to the set of access terminals from the current transmission rate to the calculated transmission rate. The predetermined equation in the sixth technique may take any of the forms described above.

As part of the decision to decrease the transmission rate at which to send PCCs directed to the set of access terminals, access network 12 may also define the set of access terminals for which the PCC transmission rate is decreased. (It should be understood that a set of access terminals may consist of a single access terminal only). For instance, access network 12 may define the set of access terminals to include all of the plurality of access terminals. Alternatively, access network 12 may define the set of access terminals to include only access terminals that are operating in a soft-handoff state. Access terminal 12 may define the set of access terminals to include other access terminals as well.

Further, as part of the decision to decrease the transmission rate at which to send PCCs directed to the set of access terminals, access network 12 may select the decreased transmission rate, which may take various forms. In some cases, the decreased transmission rate may be a predefined second transmission rate, such as, for example, 400 PCCs/second. In other cases, access network 12 may determine the second transmission rate according to various techniques, such as those described above.

At step 50, in response to deciding to decrease the transmission rate at which to send PCCs directed to the set of access terminals, access network 12 may then send the respective series of PCCs directed to each of the set of access terminals on wireless link $WL_1$ at the decreased transmission rate. As a result, access network 12 may reduce the rate at which power spikes occur on wireless link WL, which may in turn reduce the likelihood of power blocking on the wireless link.

At step 52, after sending the respective series of PCCs directed to each of the set of access terminals at the decreased transmission rate for some period of time, access network 12 may then decide to increase the transmission rate at which to send PCCs directed to the set of access terminals from the decreased transmission rate back to the current transmission rate. Access network 12 may carry out this decision according to various techniques, which may be implemented separately or together.

According to a first technique, access network 12 may decide to increase the transmission rate at which to send PCCs directed to the set of access terminals by (a) determining that a predefined period of time has passed, and (b) in response to the determining, increasing the transmission rate at which to send PCCs directed to the set of access terminals from the decreased transmission rate back to the current transmission rate.

According to a second technique, access network 12 may decide to increase the transmission rate at which to send PCCs directed to the set of access terminals by (a) determining that the determined power utilization is below a predetermined threshold and (b) in response to the determining, increasing the transmission rate at which to send PCCs directed to the set of access terminals from the decreased transmission rate back to a current transmission rate.

The predetermined threshold in the second technique may take many forms. In one instance, the predetermined threshold may be a value of power utilization in the form of, for example, a ratio. In another instance, the predetermined threshold may be a value of power utilization as well as a length of time, such that the determined power utilization is below the predetermined threshold only if the determined power utilization is less than the value of power utilization for at least the length of time. The predetermined threshold may take other forms as well. The predetermined threshold may be predetermined based on, for example, experimental data or mathematical calculations. For instance, the predetermined threshold may be determined according to a predesigned model and/or feedback regarding power utilization on wireless link $WL_1$. The predetermined threshold may take other forms as well.

Access network 12 may also decide to increase the transmission rate at which to send PCCs directed to the set of access terminals according to the other techniques that are similar to those described with respect to the decision to decrease the transmission rate (e.g., based on correlations).

IV. Exemplary Access Network Entity

Figure 4:
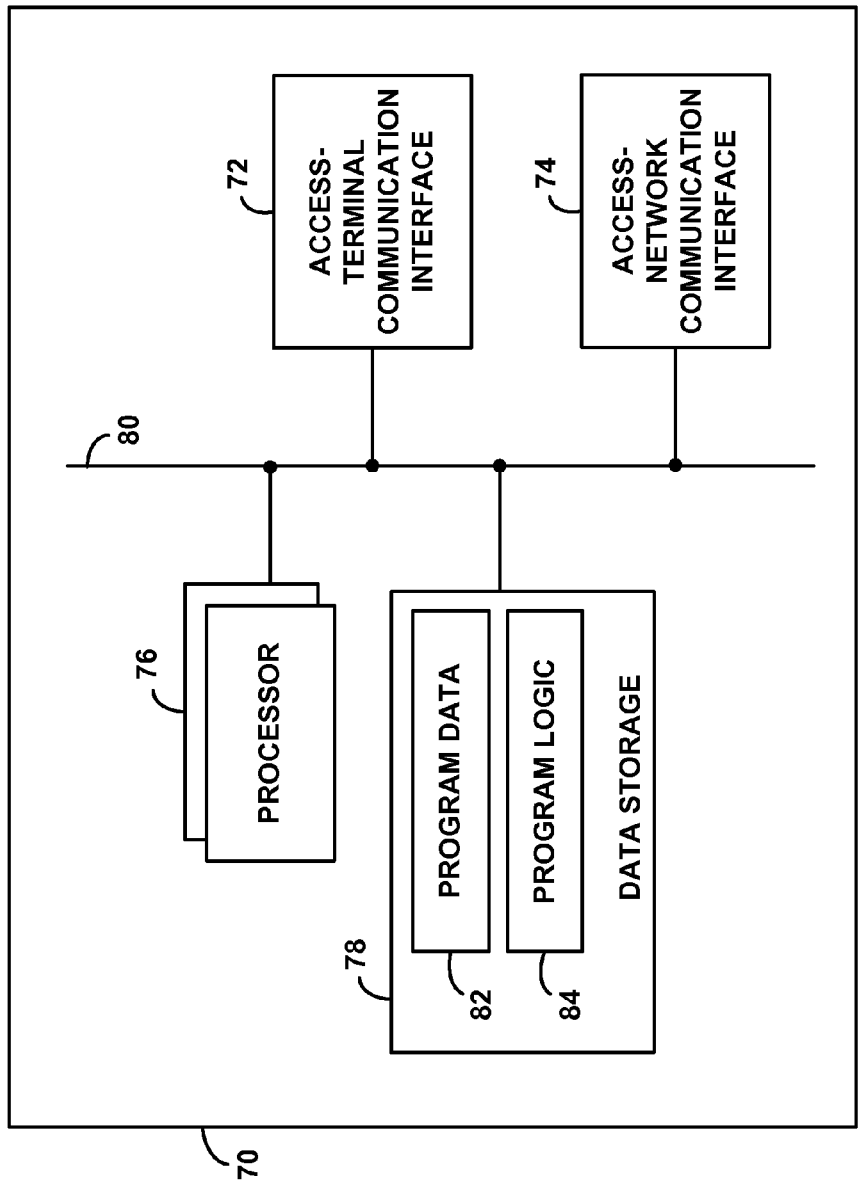
FIG. 4 is a simplified block diagram showing functional components of an exemplary access network entity capable of carrying out features of the disclosed PCC transmission scheme.

FIG. 4 is a simplified block diagram showing functional components of an exemplary access network entity capable of carrying out features of the disclosed PCC transmission scheme. The access network entity may be, for example, a base transceiver station (BTS) or any other access network entity in access network 12 capable carrying out features of the exemplary PCC transmission scheme. As shown in FIG. 4, exemplary access network entity 70 may include an access-terminal communication interface 72, an access-network communication interface 74, a processor 76, and data storage 78, all linked together via a system bus, network, or other connection mechanism 80. Access network entity 70 may include other components as well.

Referring to FIG. 4, access-terminal communication interface 72 may radiate to define one or more wireless coverage areas or sectors and provide one or more wireless links over which access terminals may communicate with access network entity 70. As such, access-terminal communication interface 72 may include one or more antenna structures arranged in various ways (e.g., one or more directional or sectored antennas). Additionally, access-terminal communication interface 72 may include at least one power amplifier for each provided wireless link. Each such power amplifier may enable access network entity 70 to adjust both its total transmission power on each forward link and its transmission power on each respective channel of each forward link. Each such power amplifier may also define practical limits on the maximum and minimum power levels at which access network entity 70 can transmit on each forward link and each respective channel of each forward link. In particular, one or more of these power amplifiers may define the maximum allowable power on a given wireless link, as used to determine the power utilization on the given wireless link. Other configurations are possible as well.

Access-network communication interface 74 may be configured to communicatively couple access network entity 70 to various other access network entities, such as one or more MSCs and/or one or more PDSNs for instance. To facilitate these couplings, access-network communication interface 74 may take various forms. For example, access-network communication interface 74 may take the form of an Ethernet interface, a serial bus interface (e.g., Firewire, USB 2.0, etc.), a chipset and antenna adapted to facilitate wireless communication according a desired protocol, and/or any other interface that provides for wired and/or wireless communication with an access network entity. Access-network communication interface 74 may also include some combination of different interfaces types. Other configurations are possible as well.

Processor 76 may comprise one or more processor components, such as general-purpose processors (e.g., a microprocessor), application-specific processors (e.g., an application-specific integrated circuit (ASIC) or digital signal processor (DSP)), programmable logic devices (e.g., a field programmable gate array (FPGA)), or other processor components now known or later developed. Data storage 78, in turn, may comprise one or more non-transitory computer-readable storage mediums, such as volatile data storage mediums (e.g., random access memory (RAM), registers, and/or cache) and/or non-volatile data storage mediums (e.g., read only memory (ROM), a hard disk drive, a solid state drive, flash memory, and/or an optical storage device). Some data storage mediums may be integrated in whole or in part with processor 76. Further, some data storage mediums may be external to and/or removable from access network entity 70 and may interface with access network entity 70 in various manners. As shown, data storage 78 may contain (i) program data 82 and (ii) program logic 84, which may be maintained either separately or together within data storage 7878.

Program data 82 may contain information relating to wireless links over which access network entity 70 may communicate with access terminals. For example, program data 82 may contain an identifier of each such wireless link (e.g., a carrier frequency and a PN offset). As another example, program data 82 may contain identifiers of forward and/or reverse channels on each such wireless link (e.g., MAC IDs and/or Walsh codes). As still another example, program data 82 may contain data defining each coverage area served by each such wireless link (e.g., indications of the shape, size, and/or location of each coverage area). Other examples are possible as well.

Further, program data 82 may contain information relating to one or more access terminals being served by access network entity 82. For example, program data 82 may contain an identifier of each such access terminal. As another example, program data 82 may contain an identifier of a wireless link serving each such access terminal. As yet another example, program data 82 may contain identifiers of any forward and/or reverse channels established with each such access terminal (e.g., MAC IDs and/or Walsh codes). Other examples are possible as well.

Further yet, program data 82 may contain information relating to each active communication session between access network entity 70 and an active access terminal. For example, program data 82 may contain data defining each such active communication session, including identifiers of the access terminal, the access network entities, the wireless link(s), and/or the forward and reverse channel(s) involved in the active communication session. As another example, for each such active communication session, program data 82 may contain an indicator of a current transmission rate at which the access network is sending PCCs directed to the access terminal involved in the communication session. As yet another example, for each such active communication session, program data 82 may contain an indicator of a transmission-power adjustment instructed by PCCs directed to the access terminal involved in the communication session. As a further example, program data 82 may contain a set of correlations, such as any of the sets of correlations described above. As a still further example, program data 82 may contain a predetermined threshold and/or a predetermined equation, such as any of the thresholds and equations described above. Other examples are possible as well.

Program logic 84 may comprise machine-language instructions that may be executed or interpreted by processor 76 to carry out functions in accordance with exemplary methods 36 and 56. For instance, program logic 84 may be executable by processor 76 to (a) engage in a respective communication session with each of a plurality of access terminals on a given wireless link, (b) send a respective series of PCCs directed to each of the plurality of access terminals on the given wireless link, (c) determine a power utilization on the given wireless link (e.g., by monitoring the power utilization or by receiving an indication of such power utilization), (d) based on the determined power utilization, decide to adjust a transmission rate at which to send PCCs directed to a set of access terminals in the plurality of access terminals on the given wireless link (e.g., such as by decreasing in response when the power utilization rises to an undesirable level), and (e) send the respective series of PCCs directed to each of the set of access terminals at the adjusted transmission rate. Program logic 84 may be executable by processor 76 to carry out various other functions as well.

V. Conclusion

Exemplary embodiments have been described above. Those skilled in the art will understand, however, that changes and modifications may be made to the embodiments described without departing from the true scope and spirit of the present invention, which is defined by the claims.

We claim:

1. A method comprising:
an access network sending a respective series of power control commands (PCCs) directed to each access terminal of a plurality of access terminals on a given wireless link having a maximum allowable power;
the access network determining a power utilization on the given wireless link, wherein the power utilization indicates an amount of the maximum allowable power being used on the given wireless link;
based on the determined power utilization, the access network deciding to adjust a transmission rate at which to send PCCs directed to a set of access terminals in the plurality of access terminals on the given wireless link to an adjusted transmission rate; and
the access network sending the respective series of PCCs directed to each access terminal of the set of access terminals on the given wireless link at the adjusted transmission rate.

2. The method of claim 1, wherein deciding to adjust the transmission rate at which to send PCCs directed to the set of access terminals comprises deciding to decrease the transmission rate at which to send PCCs directed to the set of access terminals from a current transmission rate to a decreased transmission rate that comprises the adjusted transmission rate.

3. The method of claim 2, wherein the decreased transmission rate is a predefined transmission rate.

4. The method of claim 2, further comprising:
after a predetermined period of time, the access network deciding to increase the transmission rate at which to send PCCs directed to the set of access terminals from the decreased transmission rate back to the current transmission rate; and
the access network sending the respective series of PCCs directed to each access terminal of the set of access terminals on the given wireless link at the current transmission rate.

5. The method of claim 2, wherein deciding to decrease the transmission rate at which to send PCCs directed to the set of access terminals comprises:
determining that the determined power utilization exceeds a predetermined threshold; and
in response to the determining, deciding to decrease the transmission rate at which to send PCCs directed to the set of access terminals from the current transmission rate to the decreased transmission rate.

6. The method of claim 2, wherein deciding to decrease the transmission rate at which to send PCCs directed to the set of access terminals comprises:
determining an extent by which the determined power utilization exceeds a predetermined threshold;
consulting a set of correlations between extents and transmission rates to identify a transmission rate that correlates to the determined extent;
determining that the identified transmission rate is not equal to the current transmission rate and thereby comprises the decreased transmission rate; and
in response to the determining, deciding to decrease the transmission rate at which to send PCCs directed to the set of access terminals from the current transmission rate to the identified transmission rate.

7. The method of claim 2, wherein deciding to decrease the transmission rate at which to send PCCs directed to the set of access terminals comprises:
determining an extent by which the determined power utilization exceeds a predetermined threshold;
calculating a transmission rate using the determined extent and a predetermined equation;
determining that the calculated transmission rate is not equal to the current transmission rate and thereby comprises the decreased transmission rate; and
in response to the determining, deciding to decrease the transmission rate at which to send PCCs directed to the set of access terminals from the current transmission rate to the calculated transmission rate.

8. The method of claim 1, wherein deciding to adjust the transmission rate at which to send PCCs directed to the set of access terminals comprises deciding to increase the transmission rate at which to send PCCs directed to the set of access terminals.

9. The method of claim 8, wherein deciding to increase the transmission rate at which to send PCCs directed to the set of access terminals comprises:
determining that the determined power utilization is less than a predetermined threshold; and
in response to the determining, deciding to increase the transmission rate at which to send PCCs directed to the first set of access terminals from a current transmission rate to an increased transmission rate that comprises the adjusted transmission rate.

10. The method of claim 1, wherein deciding to adjust the transmission rate at which to send PCCs directed to the set of access terminals comprises:
consulting a set of correlations between determined power utilizations and transmission rates to identify a transmission rate that correlates to the determined power utilization;
determining that the identified transmission rate is not equal to a current transmission rate and thereby comprises the adjusted transmission rate; and
in response to the determining, deciding to adjust the transmission rate at which to send PCCs directed to the set of access terminals from the current transmission rate to the identified transmission rate.

11. The method of claim 1, wherein deciding to adjust the transmission rate at which to send PCCs directed to the set of access terminals comprises:
calculating a transmission rate using the determined power utilization and a predetermined equation;
determining that the calculated transmission rate is not equal to a current transmission rate and thereby comprises the adjusted transmission rate; and
in response to the determining, deciding to adjust the transmission rate at which to send PCCs directed to the set of access terminals from the current transmission rate to the calculated transmission rate.

12. The method of claim 1, wherein the set of access terminals comprises all of the plurality of access terminals.

13. The method of claim 1, wherein the set of access terminals comprises access terminals in the plurality of access terminals that are operating in a soft-handoff state.

14. The method of claim 1, carried out periodically or continuously.

15. The method of claim 1, wherein determining the power utilization on the given wireless link comprises:
measuring an amount of power used on the given wireless link at a given time; and
dividing the measured amount of power by the maximum allowable power of the given wireless link.

16. The method of claim 1, wherein determining the power utilization on the given wireless link comprises:
making a plurality of power utilization measurements on the given wireless link over the course of a predetermined time window; and
aggregating the plurality of power utilization measurements into a single value representing the power utilization on the given wireless link.

17. A base station comprising:
a first communication interface configured to facilitate a respective communication session with each access terminal of a plurality of access terminals on a given wireless link;
a second communication interface configured to facilitate communication with one or more access network entities;
a processor;
data storage; and
program instructions stored in data storage and executable by the processor to:
send a respective series of power control commands (PCCs) directed to each access terminal of the plurality of access terminals on a given wireless link having a maximum allowable power;
determine a power utilization on the given wireless link, wherein the power utilization indicates an amount of the maximum allowable power being used on the given wireless link;
based on the determined power utilization, decide to adjust a transmission rate at which to send PCCs directed to a set of access terminals in the plurality of access terminals on the given wireless link to an adjusted transmission rate; and
send the respective series of PCCs directed to each access terminal of the set of access terminals at the adjusted transmission rate.

18. The base station of claim 17, wherein the program instructions stored in data storage being executable by the processor to decide to adjust a transmission rate at which to send PCCs directed to the set of access terminals comprises program instructions stored in data storage being executable by the processor to decide to decrease the transmission rate at which to send PCCs directed to the set of access terminals from a current rate to a decreased rate that comprises the adjusted transmission rate.

19. The base station of claim 17, wherein the program instructions stored in data storage being executable by the processor to decide to adjust a transmission rate at which to send PCCs directed to the set of access terminals comprises program instructions stored in data storage being executable by the processor to decide to increase the transmission rate at which to send PCCs directed to the set of access terminals from a current rate to an increased rate that comprises the adjusted transmission rate.

20. The base station of claim 17, wherein the program instructions stored in data storage being executable by the processor to determine a power utilization on the given wireless link comprises program instructions stored in data storage being executable by the processor to determine a power utilization on the given wireless link over the course of a predetermined time window.

* * * * *